United States Patent
Lv et al.

(10) Patent No.: US 12,444,463 B2
(45) Date of Patent: Oct. 14, 2025

(54) MEMORY CELL STRUCTURE, MEMORY ARRAY STRUCTURE, AND VOLTAGE BIASING METHOD

(71) Applicant: INSTITUTE OF MICROELECTRONICS, CHINESE ACADEMY OF SCIENCES, Bijing (CN)

(72) Inventors: Hangbing Lv, Beijing (CN); Jianguo Yang, Beijing (CN); Xiaoxin Xu, Beijing (CN); Ming Liu, Beijing (CN)

(73) Assignee: INSTITUTE OF MICROELECTRONICS, CHINESE ACADEMY OF SCIENCES, Beijing (CN)

( * ) Notice: Subject to any disclaimer, the term of this patent is extended or adjusted under 35 U.S.C. 154(b) by 500 days.

(21) Appl. No.: 17/996,194

(22) PCT Filed: Apr. 14, 2020

(86) PCT No.: PCT/CN2020/084621
§ 371 (c)(1),
(2) Date: Oct. 13, 2022

(87) PCT Pub. No.: WO2021/207916
PCT Pub. Date: Oct. 21, 2021

(65) Prior Publication Data
US 2023/0197152 A1  Jun. 22, 2023

(51) Int. Cl.
*G11C 13/00* (2006.01)
(52) U.S. Cl.
CPC ...... *G11C 13/0021* (2013.01); *G11C 13/0026* (2013.01); *G11C 13/0028* (2013.01); *G11C 13/003* (2013.01); *G11C 2213/79* (2013.01)

(58) Field of Classification Search
CPC .. H10B 61/00–22; H10N 50/80; H10N 50/85; H10N 50/01; H10D 48/40;
(Continued)

(56) References Cited

U.S. PATENT DOCUMENTS

| | | | |
|---|---|---|---|
| 8,681,556 B2 | 3/2014 | Kutsukake et al. | |
| 2002/0006058 A1* | 1/2002 | Nakajima | H10B 61/22 365/158 |

(Continued)

FOREIGN PATENT DOCUMENTS

| | | | | |
|---|---|---|---|---|
| CN | 1177211 A | * | 3/1998 | ............ H01L 27/115 |
| CN | 1420566 A | | 5/2003 | |

(Continued)

OTHER PUBLICATIONS

International Search Report for International Application No. PCT/CN2020/084621, mailed Jan. 20, 2021, 5 pages.

(Continued)

*Primary Examiner* — Matthew C Landau
*Assistant Examiner* — Nora T. Nix
(74) *Attorney, Agent, or Firm* — Knobbe, Martens, Olson & Bear, LLP (57) ABSTRACT

Provided are a memory cell structure, a memory array structure, and a voltage biasing method. The memory cell structure includes: a substrate layer, a well layer and a transistor. The substrate layer is configured to support the memory cell structure; the well layer is embedded in the substrate layer, an upper surface of the well layer is flush with an upper surface of the substrate layer, and a transistor is arranged on the well layer.

11 Claims, 6 Drawing Sheets

(58) Field of Classification Search
CPC .......... H10D 30/60–798; H10D 30/021–0415; H10D 84/83–859; H10D 86/40–60; G11C 11/14–1697; G11C 11/5607; G11C 14/0036; G11C 14/0045; G11C 14/0081; G11C 19/02–10; G11C 19/14; G11C 2211/5615–5616; H01F 41/303; H01F 10/324–3295

See application file for complete search history.

(56) References Cited

U.S. PATENT DOCUMENTS

| | | |
|---|---|---|
| 2006/0171209 A1 | 8/2006 | Sim et al. |
| 2012/0043630 A1* | 2/2012 | Omori ............... H01L 23/53238 |
| | | 257/E29.323 |
| 2014/0281231 A1* | 9/2014 | Lee ....................... H10N 50/80 |
| | | 257/427 |

FOREIGN PATENT DOCUMENTS

| | | |
|---|---|---|
| CN | 1527389 A | 9/2004 |
| CN | 101859602 A | 10/2010 |
| CN | 101866941 A | 10/2010 |
| CN | 101933096 A | 12/2010 |
| CN | 103346158 A | 10/2013 |
| JP | 2004-228396 | 8/2004 |

OTHER PUBLICATIONS

Chinese Office Action dated Jul. 1, 2022, issued in Chinese Application No. 202010288743.9, with English translation, 12 pages.

* cited by examiner

MEMORY CELL STRUCTURE, MEMORY ARRAY STRUCTURE, AND VOLTAGE BIASING METHOD

CROSS-REFERENCE TO RELATED APPLICATION

This application is a Section 371 National Stage Application of International Application No. PCT/CN2020/084621, filed on Apr. 14, 2020, entitled "MEMORY CELL STRUCTURE, MEMORY ARRAY STRUCTURE, AND VOLTAGE BIASING METHOD".

TECHNICAL FIELD

The present disclosure relates to a field of memory, and in particular, to a memory cell structure, a memory array structure, and a voltage biasing method.

BACKGROUND

With the development of semiconductor fabrication process, traditional embedded memories (mainly flash memories) below the 28 nm process node are facing technical bottlenecks such as sharp increase in process complexity, rising cost, and performance degradation. Therefore, a new type of embedded memory technology is urgently needed. In the related art, new type embedded memories include resistive random access memories (RRAM), phase change random access memories (PCRAM), magnetic random access memories (MRAM), etc., which have advantages of being compatible with CMOS technology, strong in miniaturization, and low in cost, and have received extensive research and attention.

In the related art, due to process and material limitations, the programming voltage of a new type embedded memory is lower than that of a traditional embedded memory, but it still may not be reduced to a level of a core voltage of a CMOS transistor at an advanced process node (28 nm and below). As in the field of embedded applications, most of the new type memories use a 1T1R structure, i.e., a selecting transistor is provided with a memory cell, if the programming voltage of the memory cell could not be reduced, a selector with a high withstand voltage value is required. This undoubtedly increases the area of the memory cell, which results in an increase in cost and a low efficiency within the area of an array structure.

SUMMARY

According to an aspect of the present disclosure, there is provided a memory cell structure, including: a substrate layer, a well layer and a transistor. The substrate layer is configured to provide a support for the memory cell structure, the well layer is embedded in the substrate layer, an upper surface of the well layer is flush with an upper surface of the substrate layer, and the transistor is arranged in an inside and on a surface of the well layer.

According to the embodiments of the present disclosure, the well layer includes: a first well layer and a second well layer. The first well layer is embedded in the substrate layer, an upper surface of the first well layer is flush with the upper surface of the substrate layer, and the second well layer is arranged between the first well layer and the substrate layer, an upper surface of the second well layer is flush with the upper surface of the substrate layer, and configured to space the first well layer and the substrate layer, wherein the transistor is arranged in an inside and on a surface of the first well layer.

According to the embodiments of the present disclosure, the substrate layer is a non-P-type or an N-type doped structure layer, the first well layer is a P-type doped structure layer for forming a P-type well layer, and the second well layer is an N-type doped structure layer for forming an N-type well layer as an isolation between the substrate layer and the P-type well layer.

According to the embodiments of the present disclosure, the transistor includes: a gate, a source and a drain. The gate is arranged on the upper surface of the first well layer, the source is embedded in the first well layer, an upper surface of the source is exposed to the first well layer; and the drain is embedded in the first well layer, an upper surface of the drain is exposed to the first well layer.

According to the embodiments of the present disclosure, the drain and the source are spaced for a certain distance, and the gate is arranged on the upper surface of the first well layer between the drain and the source.

According to the embodiments of the present disclosure, the memory cell structure further includes: a first resistive cell, a first interconnection layer, and a first connection line. The first resistive cell is located above the drain or the source. The first interconnection layer includes a plurality of interconnection sublayers, the first resistive cell is in contact with the upper surface of the drain or the source, and the plurality of interconnection sublayers are located above the first resistive cell. The first connection line is arranged in an arrangement direction of the first interconnection layer and the first resistive cell, and configured to connect the first interconnection layer and the first resistive cell with the source or the drain.

According to the embodiments of the present disclosure, the memory cell structure further includes: a second resistive cell, a second interconnection layer, and a second connection line. The second resistive cell is located above the drain or the source. The second interconnection layer includes a plurality of interconnection sublayers, at least one interconnection sublayer of the plurality of interconnection sublayers is located between the second resistive cell and the drain or the source, and the other interconnection sublayers are located above the second resistive cell. The second connection line is arranged in an arrangement direction of the second interconnection layer and the second resistive cell, and configured to connect the second resistive cell and the second interconnection layer with the source or the drain.

According to the embodiments of the present disclosure, the memory cell structure further includes: a first well electrode and a second well electrode. The first well electrode is embedded in the first well layer, an upper surface of the first well electrode is exposed to the first well layer, and the second well electrode is embedded in the second well layer, an upper surface of the second well electrode is exposed to the second well layer.

According to another aspect of the present disclosure, there is provided a memory array structure, including: a plurality of memory cell array groups, a plurality of bit lines, and a plurality of word lines. The plurality of memory cell array groups are arranged in parallel to one another in a first direction, each memory cell array group includes a plurality of memory cell arrays arranged in parallel to one another in a second direction, and the memory cell arrays includes a plurality of the above memory cell structures. The plurality of bit lines are arranged in parallel to one another in a first direction, at least two bit lines are respectively connected to two terminals of the plurality of memory cell arrays in a second direction. The plurality of word lines are arranged in parallel to one another in the first direction, the plurality of word lines and the plurality of bit lines are in parallel to one another, and each word line is connected to a gate electrode of a memory cell structure at a corresponding position in the plurality of memory cell arrays in the second direction.

According to the embodiments of the present disclosure, the first direction is perpendicular to the second direction.

According to the embodiments of the present disclosure, the memory cell array at least includes: a first memory cell structure and a second memory cell structure. A drain terminal of the first memory cell structure is connected to a bit line, a drain terminal of the second memory cell structure is connected to another bit line, and a source of the second memory cell structure is connected to a source of the first memory cell structure to form a common terminal. The drain terminal further includes a resistive cell connected to a drain of the first memory cell structure or a drain of the second memory cell structure.

According to the embodiments of the present disclosure, the memory array structure further includes a plurality of source lines arranged in parallel to one another in the second direction, each source line is connected to a common terminal in a corresponding memory cell array in the first direction. The source line is perpendicular to both the bit line and the word line.

According to further another aspect of the present disclosure, there is provided a voltage biasing method applied to the above memory array structure. The voltage biasing method includes: applying a bias voltage to a determined first well layer of a memory cell structure in the memory array structure; applying a source terminal voltage to a source line corresponding to a common terminal of the memory cell structure, and simultaneously applying a drain terminal voltage to a bit line corresponding to a drain terminal of the memory cell structure. A value of the bias voltage is a negative value smaller than zero, and values of the source terminal voltage and the drain terminal voltage are values greater than or equal to the value of the bias voltage.

DETAILED DESCRIPTION OF EMBODIMENTS

In order to make the objectives, technical solutions and advantages of the present disclosure clearer, the present disclosure will be further described in detail below with reference to the specific embodiments and the accompanying drawings.

In order to solve the technical problem that the programming voltage of a new type embedded memory may not be effectively reduced in the premise of controlling the area size and cost of the memory in the existing advanced process nodes, resulting in a poor structure reliability of the new type embedded memory, there is provided a memory cell structure, a memory array structure, and a voltage biasing method according to the present disclosure.

In order to clearly describe the technical solutions of the present disclosure, the memory of the present disclosure may be a new type embedded memory, such as a resistive random access memory (RRAM), and it may further be a resistive random access memory having a 1T1R basic structure unit. However, those skilled in the art should understand that this does not limit the protection scope of the claims of the present disclosure.

The programming of a new type embedded memory may include a variety of operations. For example, the programming to a resistive random access memory (RRAM) is mainly divided into three types: a forming operation, a set operation, and a reset operation.

In the forming operation, a resistive cell CELL is programmed from an initial ultra-high resistance state (above MΩ) to a relatively low resistance state (about several hundreds of KΩ). In this case, a larger programming voltage is applied to a drain terminal corresponding to a bit line BL, a gate voltage VG is applied to a gate terminal corresponding to a word line WL to turn on a selecting transistor (i.e., a selector, which is a type of transistor), and a source terminal corresponding to a source line SL is connected to a low level. At this time, as the initial value of the resistance is large, most of the voltage falls on the resistive cell CELL. As a result, even if the voltage applied to the drain terminal is large, the voltage actually falling on the selecting transistor is relatively small, and it will not affect the reliability of the transistor.

In the set operation, the source terminal is connected to a high level, and the drain terminal is connected to a low level. Although the voltage required by the set operation is lower than that required by the forming operation, as the resistance of the resistive cell CELL is small, a substrate bias effect exists in the selector, and the voltage applied to the source terminal is relatively large, the voltage applied to the transistor will exceed its maximum limit without a reasonable voltage biasing manner being used. This makes the selecting transistor easy to be broken down, thereby resulting in a reliability problem.

In the reset operation, a set voltage is applied to the drain terminal, and the source terminal is connected to a low level. As the memory cell is in a low resistance state, a large portion of the voltage will fall on the selector. Therefore, the selector faces the same reliability problem.

Figure 1A:
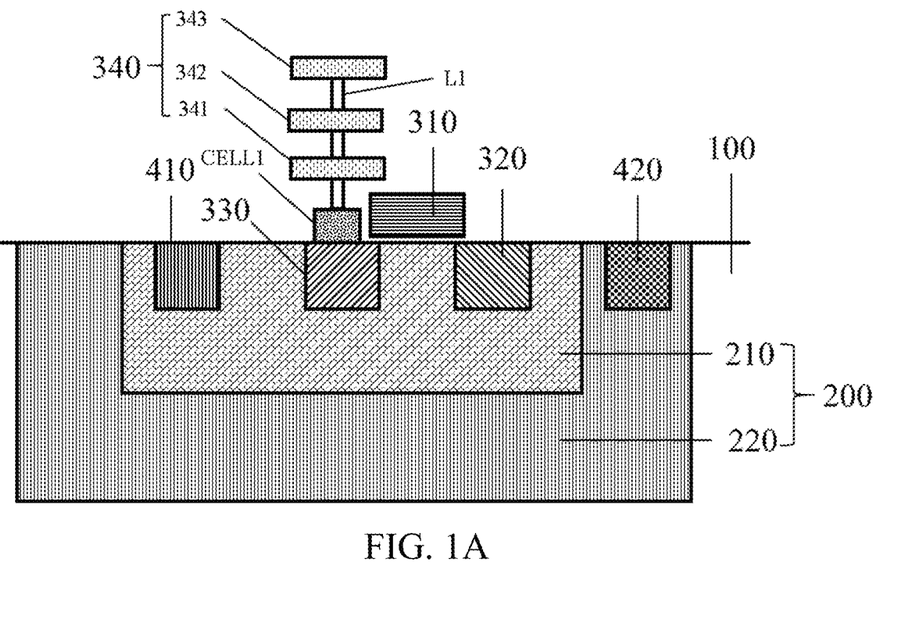
FIG. 1A is a schematic diagram of a cross section of a construction of a memory cell structure according to an embodiment of the present disclosure.
Figure 1B:
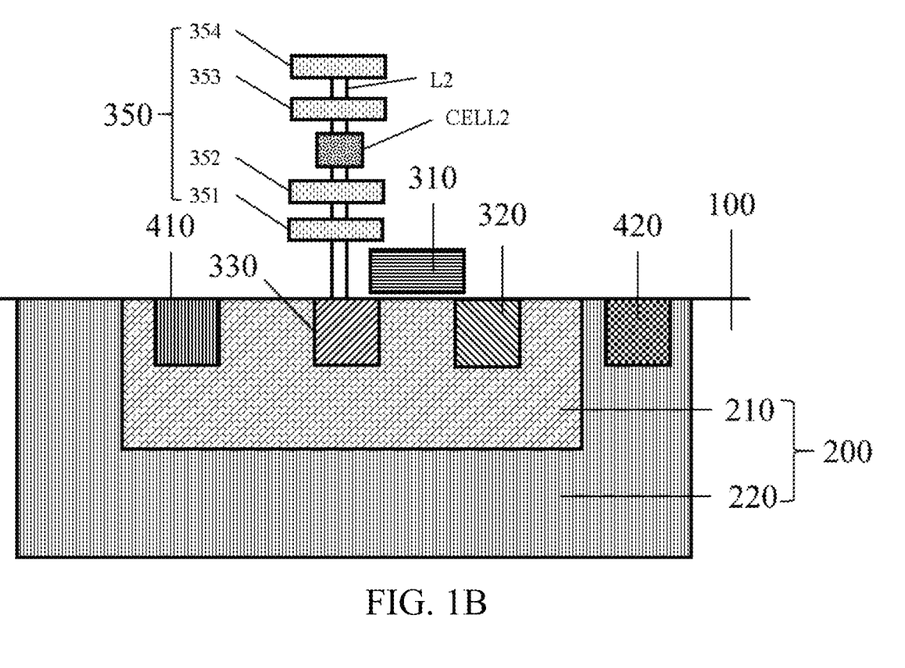
FIG. 1B is a schematic diagram of a cross section of a construction of a memory cell structure according to another embodiment of the present disclosure.

According to an aspect of the present disclosure, a memory cell structure is provided. As shown in FIG. 1A and FIG. 1B, the memory cell structure includes a substrate layer 100, a well layer 200 and a transistor, and the substrate layer 100 is configured to provide a support for the memory cell structure.

The well layer 200 is embedded in the substrate layer 100. An upper surface of the well layer 200 is flush with an upper surface of the substrate layer 100. The substrate layer 100 is provided with a groove that is concave downward from its upper surface. The well layer 200 may be formed in the groove by a chemical vapor deposition process.

The transistor is arranged in an inside and on a surface of the well layer 200. The transistor may be a selector configured to control a reading and writing of data and a signal output in the memory cell so as to isolate interferences of adjacent memory cells, and the transistor is more compatible with the CMOS technology.

According to the embodiments of the present disclosure, as shown in FIG. 1A and FIG. 1B, the well layer 200 includes a first well layer 210 and a second well layer 220. The first well layer 210 is embedded in the substrate layer 100, and an upper surface of the first well layer 210 is flush with the upper surface of the substrate layer 100 for forming a transistor structure, wherein the transistor is arranged in an inside and on the surface of the first well layer. The second well layer 220 is arranged between the first well layer 210 and the substrate layer 100, and an upper surface of the second well layer 220 is flush with the upper surface of the substrate layer 100 for spacing the first well layer 210 and the substrate layer 100.

In other words, the second well layer 220 is formed on an inner surface of the groove of the above substrate layer 100. Specifically, the second well layer 220 may be formed on the inner surface of the groove by a chemical vapor deposition process, and in direct contact with the inner surface of the groove. The first well layer 210 is formed on the second well layer 220, that is, an outer surface of the second well layer 220 is in contact with the inner surface of the first well layer 210 (i.e., side surfaces and a lower surface other than the upper surface of the first well layer 210). Therefore, the second well layer 220 may form an isolation layer between the first well layer 210 and the substrate layer 100 to prevent the first well layer 210 from contacting the substrate layer.

Further, the substrate layer 100 may be a non P-type or an N-type doped structure layer. The first well layer 210 may be a P-type doped structure layer for forming a P-type well layer and accordingly forming a transistor. The second well layer 220 may be an N-type doped structure layer for forming an N-type well layer and for forming isolation between the substrate layer 100 and the P-type well layer. In this way, a deep well bias structure of the present disclosure is constituted. The first well layer 210 as a P-type well layer may be biased to a negative voltage VB, and the second well layer 220 as an N-type well layer may be biased to a power supply voltage VCC, the substrate layer 100 may be biased to a grounded Vsub as shown in FIG. 2, so that the problem of a PN forward conduction will not occur when a negative voltage is applied to the drain terminal and the source terminal.

In the present disclosure, the above deep well bias technology is adopted, a deep well process transistor is selected, and a well potential is biased in a negative voltage state, so that a negative voltage may be connected to the source terminal or the drain terminal of the transistor. In this way, the voltage applied to the drain terminal or the source terminal is reduced, and it is only necessary to ensure that the voltage difference falling on the memory cell meets the requirements. At the same time, it is ensured that the voltage difference between different terminals of the transistor will not exceed its breakdown voltage, thereby avoiding the reliability problem caused by a breakdown of the resistive cell CELL of the transistor.

Figure 2:
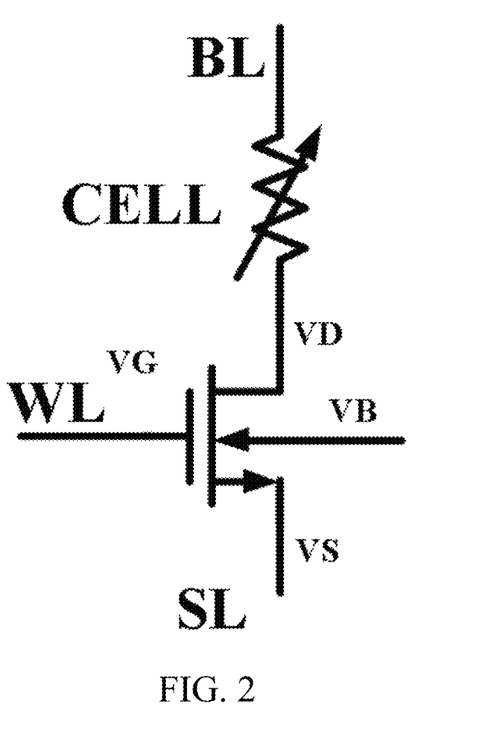
FIG. 2 is a schematic diagram of a corresponding equivalent circuit of a memory cell structure shown in FIG. 1A or FIG. 1B according to the embodiments of the present disclosure.

According to the embodiments of the present disclosure, as shown in FIG. 1A, FIG. 1B and FIG. 2, the transistor includes: a gate 310, a source 320 and a drain 330. The gate 310 is arranged on the upper surface of the first well layer 210, and configured to be connected to a word line WL to form a corresponding gate terminal and applied with a gate voltage VG to turn on the transistor, as shown in FIG. 2.

The source 320 is embedded in the first well layer 210, and an upper surface of the source 320 is exposed to the first well layer 210. The upper surface of the source 320 may be flush with the upper surface of the first well layer 210. The source 320 is configured to be connected with a source line SL to form a corresponding source terminal and applied with a source terminal voltage VS, as shown in FIG. 2.

The drain 330 is embedded in the first well layer 210, and an upper surface of the drain 330 is exposed to the first well layer 210. The upper surface of the source may be flush with the upper surface of the first well layer 210. The source is configured to be connected to a bit line BL to form a corresponding drain terminal and applied with a drain terminal voltage VD, as shown in FIG. 2.

The gate 310, the source 320, the drain 330 and the first well layer 210 form the transistor of the memory cell structure. It should be noted that a plurality of transistors may be arranged in the first well layer 210, and a transistor array may be formed on the first well layer 210. Specifically, a gate may be correspondingly arranged on the upper surface of the first well layer 210 on the other side of the source 320, and the gate and the above transistor structure share the source 320. Correspondingly, a plurality of other gates may be arranged on the upper surface of the first well layer 210 to form a plurality of transistor structures that may be turned on, so as to ensure that the size and area of the memory cell structure are smaller and the transistor integration is higher.

According to the embodiments of the present disclosure, as shown in FIG. 1A, FIG. 1B and FIG. 2, the drain 330 and the source 320 are spaced apart by a certain distance to prevent a contact short circuit of the structure. The gate 310 is arranged on the upper surface of the first well layer 210 between the drain 330 and the source 320. In other words, the first well layer 210 having a certain thickness is spaced between the drain 330 and the source 320, and the gate 310 is correspondingly arranged on the upper surface of the first well layer 210 corresponding to this portion. One terminal of the gate 310 corresponds to the drain 330, and the other terminal thereof corresponds to the source 320, as shown in FIG. 1A and FIG. 1B.

According to the embodiments of the present disclosure, as shown in FIG. 1A, the memory cell structure further includes: a first resistive cell CELL1, a first interconnection layer 340 and a first connection line L1. The first resistive cell CELL1 is located above the drain 330 or above the source 320. The first interconnection layer 340 includes a plurality of interconnection sublayers. The first resistive cell CELL1 is in contact with the upper surface of the drain 330 or the source 320, and the plurality of interconnection sublayers are located above the first resistive cell CELL1. The first connection line L1 is arranged in a setting direction of the first interconnection layer 340 and the first resistive cell CELL1 for connecting the first interconnection layer 340 and the first resistive cell CELL1 with the source 320 or the drain 330.

Specifically, the first interconnection layer 340 may include a plurality of interconnection sublayers, and each interconnection sublayer may be a metal layer for an electrical connection among various constituent structures of the memory cell structure, for example, an interconnection sublayer may form a bit line, a word line or a source line, etc. The first resistive cell CELL1 is in contact with the upper surface of the drain 330 or the source 320. This may be understood as that it is directly connected to the drain 330 or the source 320, and the two are no longer connected by another other structure except the first connection line L1. Therefore, the first interconnection layer 340 needs to be arranged above the first resistive cell CELL1. As shown in FIG. 1A, the plurality of interconnection sublayers at least include a first interconnection sublayer 341, a second interconnection sublayer 342, and a third interconnection sublayer 343, which are spaced in sequence from bottom to top. The first resistive cell CELL1 is correspondingly arranged below the first interconnection sublayer 341, and is connected to the drain 330. Additionally, the first connection line L1 sequentially connects the first resistive cell CELL1, the first interconnection sublayer 341, the second interconnection sublayer 342, and the third interconnection sublayer 343 in a vertical direction. The drain 330 and the first resistive cell CELL1 may also be connected to each other by means of the first connection line L1. Therefore, the memory cell structure of the present disclosure may form a 1T1R type structure having a resistive cell.

According to another embodiment of the present disclosure, as shown in FIG. 1B, the memory cell structure further includes: a second resistive cell CELL2, a second interconnection layer 350 and a second connection line L2. The second resistive cell CELL2 is located above the drain 330 or above the source 320. The second interconnection layer 350 includes a plurality of interconnection sublayers. At least one interconnection sublayer of the plurality of interconnection sublayers is located between the second resistive cell CELL2 and the drain 330 or the source 320, and the other interconnection sublayers are located above the second resistive cell CELL2. The second connection line L2 is arranged in a setting direction of the second interconnection layer 350 and the second resistive cell CELL2 for connecting the second resistive cell CELL2 and the second interconnection layer 350 and with the source 320 or the drain 330.

Specifically, the second interconnection layer 350 may include a plurality of interconnection sublayers, and each interconnection sublayer may be a metal layer for an electrical connection among various constituent structures of the memory cell structure, for example, an interconnection sublayer may form a bit line, a word line or a source line, etc. As shown in FIG. 1B, the plurality of interconnection sublayers at least include a first interconnection sublayer 351, a second interconnection sublayer 352, a third interconnection sublayer 353, and a fourth interconnection sublayer 354, which are spaced in sequence from bottom to top. At least the first interconnection sublayer 351 and the second interconnection sublayer 352 are located between the second resistive cell CELL2 and the drain 330 or the source 320, and the other interconnection sublayers, i.e., the third interconnection sublayer 353 and the fourth interconnection sublayer 354 are located above the second resistive cell CELL2. That is, the second resistive cell CELL2 is correspondingly arranged below the third interconnection sublayer 353 and above the second interconnection sublayer 352, and is no longer directly connected to the drain 330. Additionally, the second connection line L2 sequentially connects the first interconnection sublayer 351, the second interconnection sublayer 352, the second resistive cell CELL2, the third interconnection sublayer 353, and the fourth interconnection sublayer 354 in a vertical direction. Therefore, the memory cell structure of the present disclosure may form a 1T1R type structure having a resistive cell.

It should be seen that the resistive cell CELL of the memory cell structure of the present disclosure is located between the drain 330 or the source 320 and the bit line as well as the source line, and is configured to form a drain terminal or a source terminal. Additionally, the resistive cell CELL may meet the design requirements of different memory cell structures, the preparation requirements of different preparation processes, and perform designs of different positions relative to the source or the drain. This is beneficial to the preparation of devices of the memory cell structure having a 1T1R type structure.

It should be noted that, in the embodiments of the present disclosure, "first" and "second" are only limitation words used to express the solution more clearly, and are not used to indicate that the two are different memory cell structures. For example, the first resistive cell CELL1 and the second resistive cell CELL2 may be resistive cells of the same type, or may be resistive cells of different types. The type is determined by other constituent structures (e.g. the transistor design) of the corresponding memory cell structure described above.

According to the embodiments of the present disclosure, as shown in FIG. 1A, FIG. 1B and FIG. 2, the memory cell structure further includes: a first well electrode 410 and a second well electrode 420. The first well electrode 410 is embedded in the first well layer 210, an upper surface of the first well electrode 410 is exposed to the first well layer 210, and the upper surface of the first well electrode 410 may be flush with the upper surface of the first well layer 210. The first well electrode 410 is spaced from the constitution structure of the transistor in a certain distance, and the upper surface of the first well electrode 410 is also flush with the upper surface of the substrate layer 100.

The second well electrode 420 is embedded in the second well layer 220, an upper surface of the second well electrode 420 is exposed to the second well layer 220, and the upper surface of the second well electrode 420 may be flush with the upper surface of the second well layer 220, while being flush with the upper surface of the substrate layer 100.

Therefore, a deep well bias process is adopted in the present disclosure. As shown in FIG. 1A, FIG. 1B and FIG. 2, a transistor (e.g. NMOS transistor) is formed in an inside and on a surface of the first well layer 210 of a deep well structure. Thereby, an independent bias voltage may be set for the first well layer 210, i.e., a negative voltage VB is applied, so that a negative voltage may be applied to the drain terminal or the source terminal. In this way, when the value of negative voltage VB is smaller than a value of a negative voltage applied to the drain terminal or the source terminal, the PN forward conduction problem will not occur. Specifically, referring to FIG. 1A, FIG. 1B and FIG. 2, there are three operation methods according to the above memory cell structure: a forming operation, a set operation, and a reset operation. Further description will be made in the present disclosure as follows.

In the forming operation process, a forming operation direction is from the drain terminal to the source terminal. As shown in FIG. 1A, FIG. 1B and FIG. 2, the first well layer 210 is biased to a negative voltage, i.e., a negative voltage VB, and the source terminal is biased to a negative voltage VS. In order to prevent the PN forward conduction between the substrate layer 100 and the source terminal, it is necessary to ensure that and the value of negative voltage VB is smaller than the value of negative voltage VS. At this time, the voltage applied to the drain terminal is VD, and the voltage falling on the resistive cell CELL is VD-VS. As VS is negative, in this biasing method, the voltage applied on the drain terminal is reduced to a magnitude of the source terminal voltage, i.e., the voltage VS. In other words, this directly reduces the difficulty of transmitting a high voltage to the drain terminal by a peripheral circuit, and at the same time ensures the requirement of a programming voltage on the resistive cell CELL. Moreover, the voltage differences among various terminals of the selector are within its reliability voltage (a common transistor may satisfy a redundant voltage of 1 time of its normal voltage).

In the set operation process, a set operation direction is from the source terminal to drain terminal. As shown in FIG. 1A, FIG. 1B and FIG. 2, the first well layer 210 is biased to a negative voltage, i.e., a negative voltage VB, and the drain terminal is biased to a negative voltage VD. At this time, in order to prevent the PN forward conduction between the substrate layer 100 and the drain terminal, it is necessary to ensure that the value of negative voltage VB is smaller than the value of negative voltage VD. At this time, the voltage applied to the source terminal is VS, the voltage falling on the resistive cell CELL is VD=VG−Vth, and Vth is a threshold voltage of the resistive cell CELL. As VD is a negative value, in this biasing method, the voltage VG applied to the gate terminal is reduced to the magnitude of the drain terminal voltage VD, and this directly reduces the difficulty of transmitting a high voltage to the gate (i.e., Gate) of the transistor by the peripheral circuit, reduces the risk of a gate breakdown by the high voltage, and at the same time, ensures the requirement of the programming voltage on the resistive cell CELL. Moreover, the voltage differences among various terminals of the selector are within its reliability voltage (a common transistor may satisfy a redundant voltage of 1 time of its normal voltage).

In the reset operation process, as the direction of the reset operation is the same as that of the forming operation, and the required voltage is also the same, the method of the reset operation may be the same as that of the forming operation. It will not be repeated here.

Figure 3:
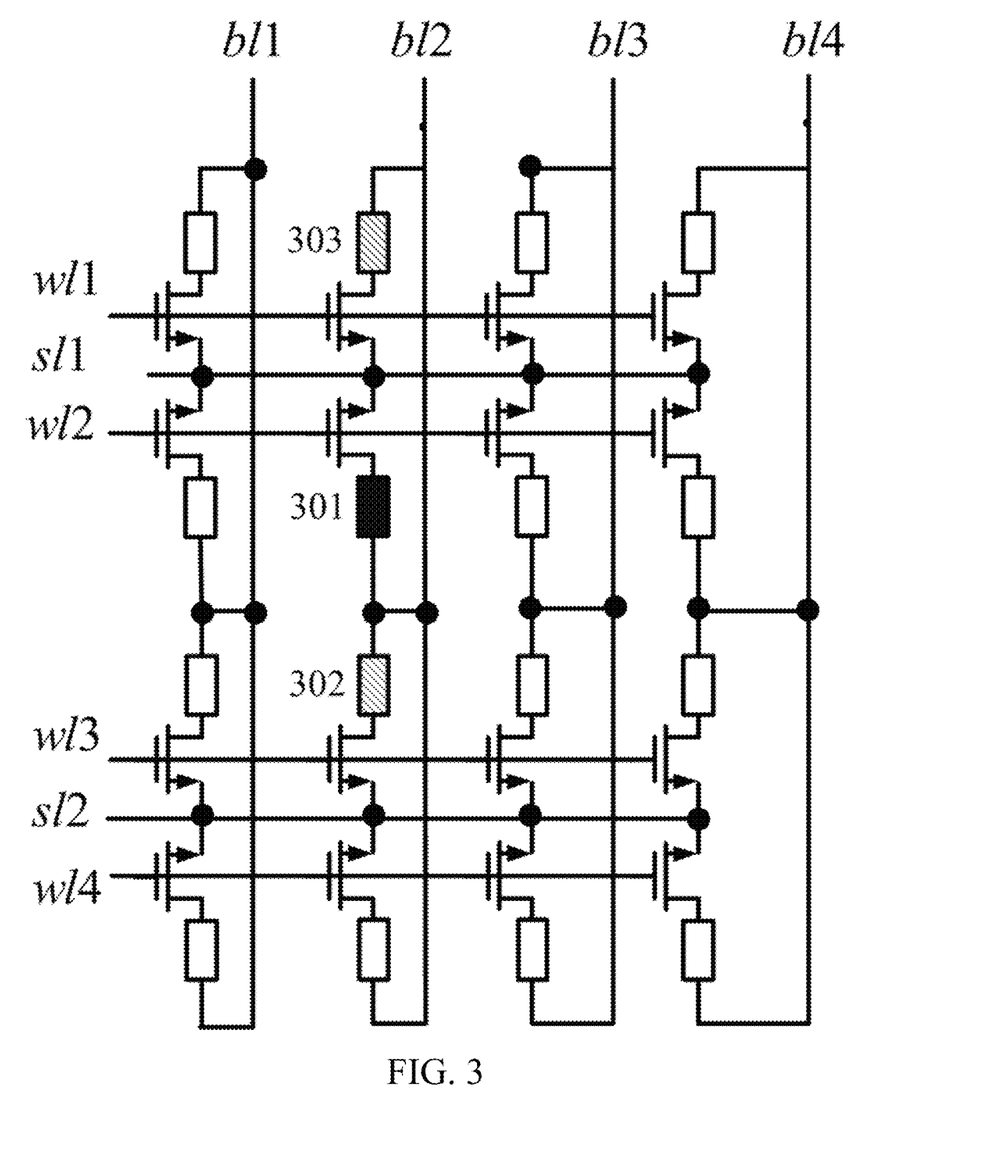
FIG. 3 is a schematic diagram of a construction of a memory cell array structure in the prior art.

It should be further noted that, based on a traditional memory structure, such as an NOR memory structure shown in FIG. 3, the word line wl and the source line sl of a common memory cell array are parallel to each other and at the same time perpendicular to the bit line bl. However, when the memory cell structure adopts the memory cell structure of the deep well negative voltage bias structure described above in the present disclosure, the array structure may have the problem that the selector of a half-selected cell is subjected to a large voltage, and thereby broken down. In the embodiments of the present disclosure, the half-selected cell may be the resistive cell CELL of the memory cell structure 302 and the resistive cell CELL of the memory cell structure 303 as shown in FIG. 3, and the selected cell may be the resistive cell CELL of the memory cell structure 301. After the memory cell structure 301 is selected, one of the word line wl, the bit line bl and the source line sl of the unselected memory cell structures 302 and 303 will be also subject to a selected voltage of the selected cell 301.

As shown in FIG. 3, it is assumed that a Forming operation or a reset operation is to be performed on the memory cell structure 301 in the second row and the second column (a set operation is similar and will not be repeated), i.e., the memory cell structure 301 is the selected cell. At this time, as the source terminal of the memory cell structure 301 corresponding source line sl1 is biased to a negative voltage vs1, the voltage vg1 applied to the gate terminal of the memory cell structure 301 corresponding word line wl2 is larger than the negative voltage vs1 of the source terminal by a threshold voltage. For the unselected memory cell structures 302, 303, if the gate terminal voltage vg3 applied to the gate terminal of the memory cell structure 303 corresponding word line wl1 needs to turn off the resistive cell CELL of the memory cell structure 303 in the first row, the biased voltage of the memory cell structure 303 corresponding source line sl1 may be selected to be equal to vs1. At this time, the voltage applied to the drain terminal corresponding to bit line bl2 is a high voltage vd, the resistive cell CELL of the memory cell structure 301 is selected, and the selector corresponding to 301 is turned on. Due to the existence of the resistive cell CELL, a considerable voltage will fall on the resistive cell CELL, and the voltage falling on the transistor is much lower than its drain terminal voltage vd, and thus the voltages of the source-drain terminal and the gate-drain terminal of the transistor are relatively small, which will not cause a breakdown of the transistor. However, for the adjacent memory cell structures 302 and 303 in the same column as the selected memory cell structure 301, as their transistors are not turned on, their drain terminal voltages are equal to the above voltage vd. This voltage is relatively large, and in order to meet the voltage requirements of the selected memory cell structure 301, a relatively negative source terminal voltage will be applied to the corresponding source line sl1. As a result, the voltages of the source-drain terminal and the gate-drain terminal of the transistors not turned on in the memory cell structure 303 in the first row and the memory cell structure 302 in the third row are very large, and this is very likely to cause a breakdown of the transistors.

Figure 4:
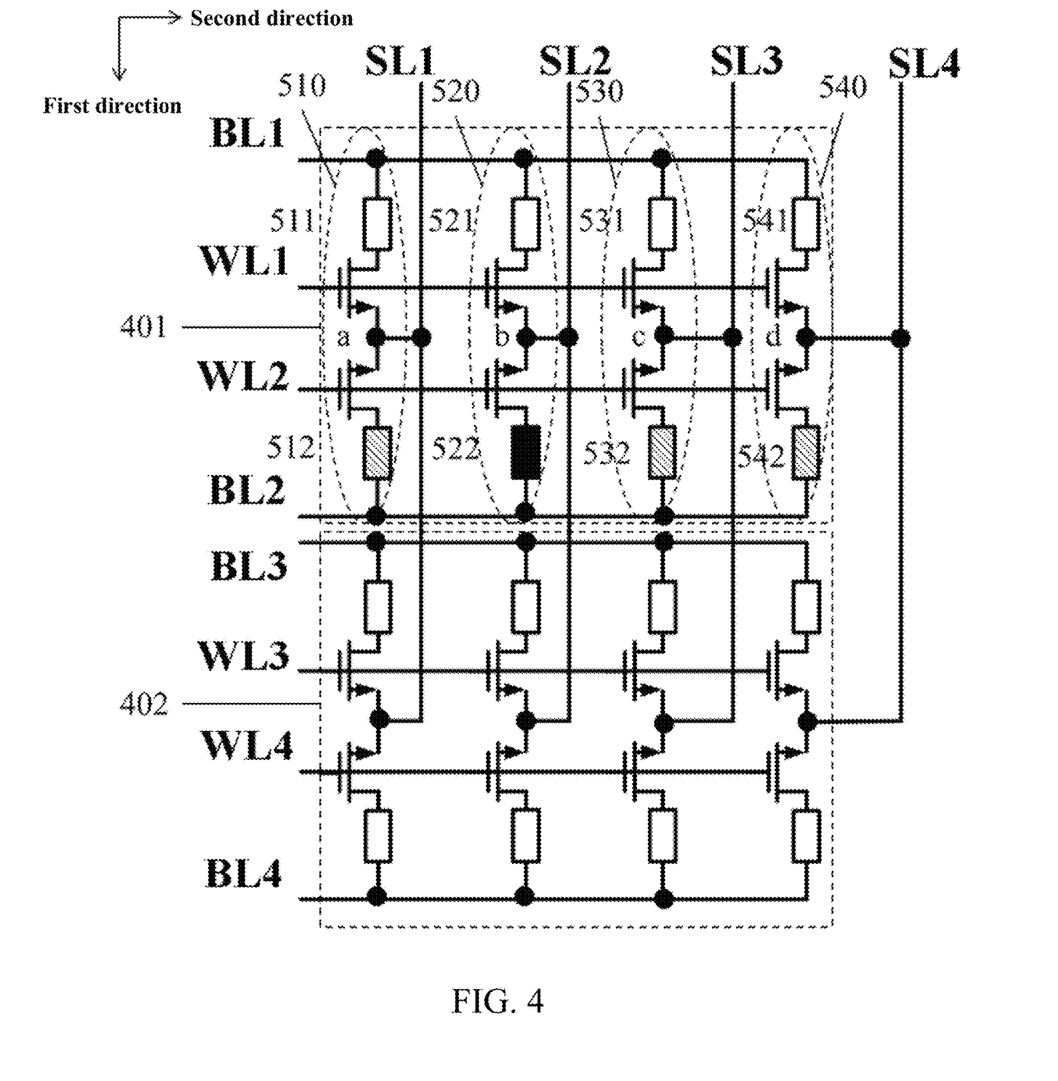
FIG. 4 is a schematic diagram of a construction of a memory cell array structure according to the embodiments of the present disclosure.

In order to solve the above reliability problem of the memory cell array structure caused by the deep well bias structure adopted in the present disclosure, according to another aspect of the present disclosure, there is provided a memory array structure. As shown in FIG. 4, the memory array structure includes: a plurality of memory cell array groups, a plurality of bit lines and a plurality of word lines. The plurality of memory cell array groups are arranged in parallel to one another in a first direction. In FIG. 4, a partial constitution structure of a memory array structure is shown, specifically to a memory cell array structure with four rows and four columns. This memory cell array structure includes two memory cell array groups 401 and 402, and the memory cell array group 402 is arranged in parallel in the first direction relative to the memory cell array group 401. Each memory cell array group includes: a plurality of memory cell arrays arranged in parallel to one another in a second direction, and each memory cell array includes a plurality of the above memory cell structures. As shown in FIG. 4, the memory cell array group 401 includes four memory cell arrays 510, 520, 530 and 540, and the memory cell arrays 510, 520, 530 and 540 are arranged in parallel to one another in the second direction to constitute a memory cell array structure with two lines and four columns.

The plurality of bit lines are arranged in parallel to one another in the first direction, and at least two bit lines are respectively connected to two terminals of the plurality of memory cell arrays in the second direction. As shown in FIG. 4, there may exist bit lines BL1 and BL2 in the memory cell array group 401. BL1 and BL2 are arranged in parallel to each other in the first direction, BL1 is connected to upper terminals of the memory cell arrays 510, 520, 530 and 540 in the second direction, i.e., connected to drain terminals of the memory cell structures 511, 521, 531 and 541. BL2 is connected to lower terminals of the memory cell arrays 510, 520, 530 and 540 in the second direction, i.e., connected to drain terminals of the memory cell structures 512, 522, 532 and 542. Correspondingly, there may be bit lines BL3 and BL4 in the memory cell array group 402, and the connection relationships thereof may refer to those of the above BL1 and BL2, which will not be repeated here. It should be noted that the bit lines BL1, BL2, BL3 and BL4 are arranged in parallel to one another in the first direction.

The plurality of word lines are arranged in parallel to one another in the first direction, the plurality of word lines and the plurality of bit lines are parallel to one another, and each word line is connected to a gate of a memory cell structure at a corresponding position among the plurality of memory cell arrays in the second direction. As shown in FIG. 4, there may exist word lines WL1 and WL2 in the memory cell array group 401, and WL1 and WL2 are arranged in parallel to each other in the first direction. WL1 is connected to gates (i.e., gate terminals) of the memory cell structures 511, 521, 531 and 541 in the corresponding positions of the memory cell arrays 510, 520, 530 and 540 in the second direction, and WL2 is connected to the gates of the memory cell structures 512, 522, 532 and 542 in the corresponding positions of the memory cell arrays 510, 520, 530 and 540 in the second direction. In the embodiments of the present disclosure, the memory cell structure 511 of the memory cell array 510 is located in the first row and the first column of the memory cell array group 401. In the memory cell array group 401, the memory cell structures at the corresponding position are a memory cell structure 521 of the memory cell array 520, a memory cell structure 531 of the memory cell array 530, and a memory cell structure 541 of the memory cell array 540. Correspondingly, there may be word lines WL3 and WL4 in the memory cell array group 402, and the connection relationships thereof may refer to those of the above WL1 and WL2, which will not be repeated here. It should be noted that the word lines WL1, WL2, WL3 and WL4 are arranged in parallel to one another in the first direction.

Therefore, in the memory array structure of the present disclosure, the bit lines BL1, BL2, BL3 and BL4 and the word lines WL1, WL2, WL3 and WL4 are arranged in parallel to one another in the first direction, i.e., the bit lines and the word lines are arranged in parallel to one another.

According to the embodiments of the present disclosure, as shown in FIG. 4, the first direction is perpendicular to the second direction.

According to the embodiments of the present disclosure, as shown in FIG. 4, the memory cell array at least includes: a first memory cell structure and a second memory cell structure, a drain terminal of the first memory cell structure is connected to a bit line, a drain terminal of the second memory cell structure is connected to another bit line, and a source of the second memory cell structure is connected to a source of the first memory cell structure to form a common terminal. Specifically, the memory cell array 510 may include at least a first memory cell structure 511 and a second memory cell structure 512. The "first" and "second" here are only limitation words to make the solution more clear, and are not intended to indicate that the first memory cell structure 511 and the second memory cell structure 512 are different memory cell structures. In other words, the first memory cell structure 511 and the second memory cell structure 512 may be deep well bias structures of the same type or may also be deep well bias structures of different types. The types are determined by different designs of the above first well layer 210, the second well layer 220 and the transistor.

The drain terminal further includes a resistive cell connected to the drain of the first memory cell structure or the second memory cell structure. In other words, a resistive cell may be arranged between the drain and the bit line, and the drain and the bit line are connected through the resistive cell. As shown in FIG. 4, the drain of the first memory cell structure 511 is connected to the resistive cell, and this resistive cell is connected to a bit line BL1 to form a drain terminal between this resistive cell and the bit line BL1. The drain of the second memory cell structure 512 is connected to the resistive cell, and this resistive cell is connected to another bit line BL2 to form a drain terminal between this resistive cell and the bit line BL2. The source of the second memory cell structure 512 is connected to the source of the first memory cell structure 511 to form a common terminal a for being connected to the source line SL1 to form a common source terminal. Correspondingly, the memory cell array 520 may include the first memory cell structure 521, the second memory cell structure 522 and a common terminal b of the two. The memory cell array 530 may include the first memory cell structure 531, the second memory cell structure 532 and a common terminal c of the two. The memory cell array 540 may include the first storage cell structure 541, the second memory cell structure 542 and a common terminal d of the two. These will not be repeated here.

According to the embodiments of the present disclosure, as shown in FIG. 4, a plurality of source lines are included, which are arranged in parallel to one another in the second direction, and each source line is connected to a common terminal in the corresponding memory cell array in the first direction. The source lines are perpendicular to the bit lines and the word lines at the same time. Specifically, the source lines SL1, SL2, SL3 and SL4 are arranged in parallel to one another in the second direction, wherein the source line SL1 is connected to the common terminal a of the memory cell array 510 and a common terminal of a corresponding memory cell array of the memory cell array group 402 in the first direction. The source line SL2 is connected to the common terminal b of the memory cell array 520 and a common terminal of a corresponding memory cell array of the memory cell array group 402 in the first direction. The source line SL3 is connected to the common terminal c of the memory cell array 530 and a common terminal of a corresponding memory cell array of the memory cell array group 402 in the first direction. The source line SL4 is connected to the common terminal d of the memory cell array 540 and a common terminal of a corresponding memory cell array of the memory cell array group 402 in the first direction. In the embodiments of the present disclosure, the second direction is perpendicular to the first direction, and the source lines are perpendicular to the bit lines and the word lines. It should be seen that in the memory array structure using the deep well bias memory cell structure in the present disclosure, the bit lines and the word lines are parallel to one another, and at the same time the bit lines and the word lines are perpendicular to the source lines. This completely subverts the array constitution design of the traditional memory array structure in which the word lines and the source lines are parallel to one another, and at the same time the word lines and the source lines are perpendicular to the bit lines, and forms a brand new memory cell array construction structure. It may be said to be a pioneering design in the field of memory technology.

Figure 5:
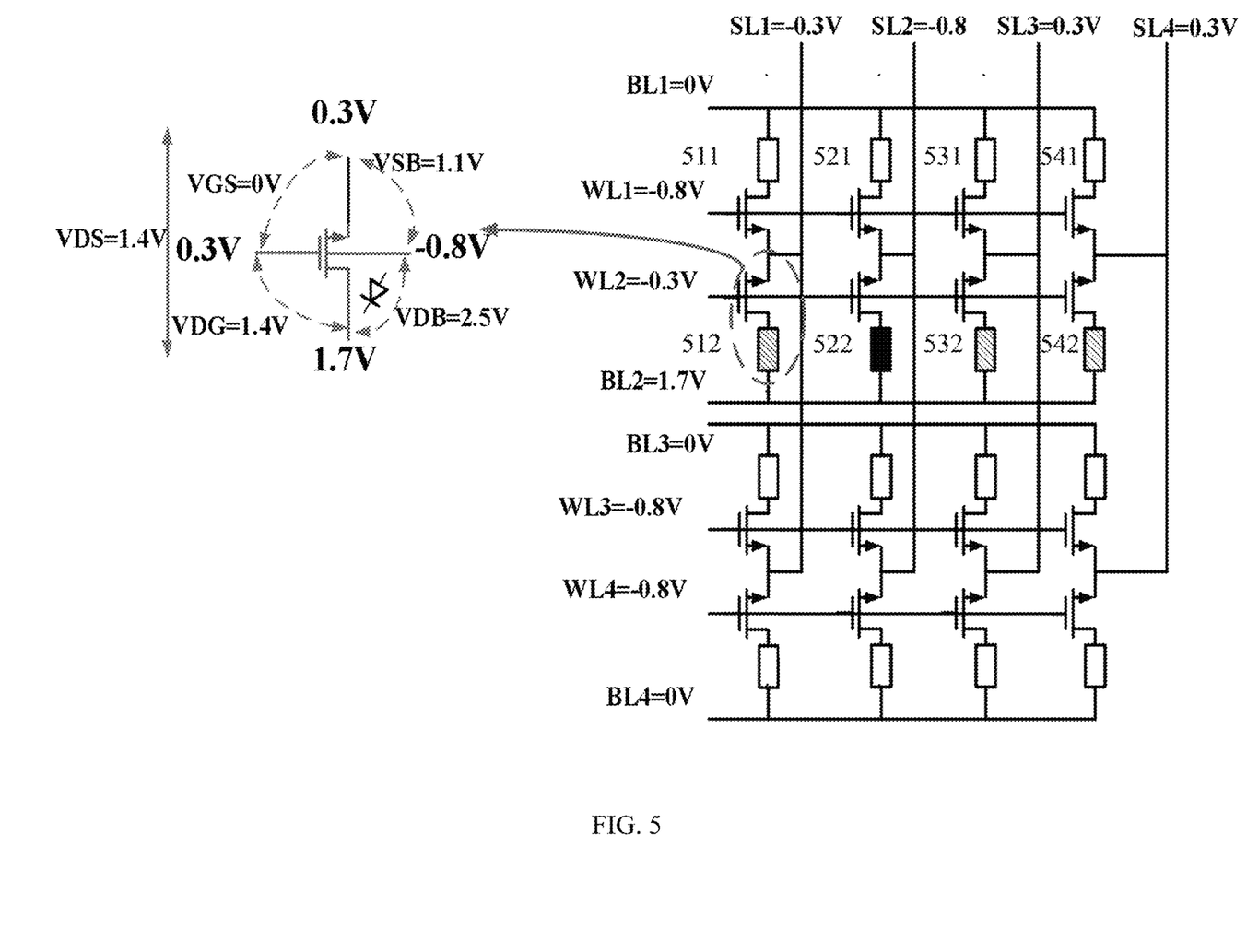
FIG. 5 is a schematic diagram of a voltage bias of a memory cell array structure shown in FIG. 4 according to the embodiments of the present disclosure.
Figure 6:
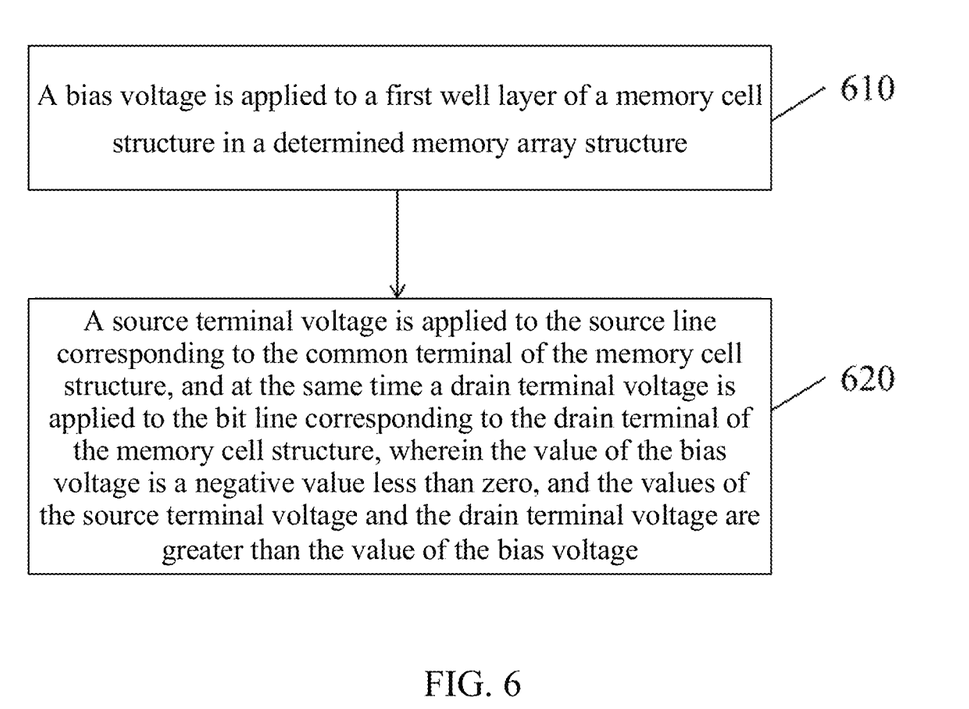
FIG. 6 is a schematic flowchart of a voltage biasing method for a memory cell array structure according to the embodiments of the present disclosure.

In order to further reflect the technical effect of the above memory array structure, referring to FIG. 4 and FIG. 5, according to another aspect of the present disclosure, there is provided a voltage biasing method applied for the above memory array structure. As shown in FIG. 6, the voltage biasing methods includes the steps as follows.

S610: a bias voltage VB is applied to a first well layer of a memory cell structure in a determined memory array structure. In the embodiments of the present disclosure, the determined memory cell structure corresponds to the above memory cell structure having a deep well bias structure. The word "determined" may be understood as "selected". That is, the memory cell structure is selected, such as the memory cell structure 522 shown in FIG. 4 or FIG. 5. Further, the first well electrode 410 of the first well layer 210 is configured to be applied with a bias voltage VB, and the bias voltage may be a negative voltage, for example, the bias voltage VB=−0.8V, as shown in FIG. 1A or FIG. 1B and FIG. 5. Therefore, the setting of the first well layer 210 is a setting position provided by the first well electrode 410, and the bias voltage VB applied to the first well electrode 410 will not affect other memory constitution structures other than the selected memory cell structure. This further provides a high pertinence and accuracy of the voltage bias, while avoiding the risk of large voltage breakdown to the transistors of the memory cell structures other than the selected memory cell structure.

S620: a source terminal voltage VS is applied to the source line corresponding to the common terminal of the memory cell structure, and at the same time a drain terminal voltage VD is applied to the bit line corresponding to the drain terminal of the memory cell structure, as shown in FIG. 1A or FIG. 1B. The common terminal may be the common terminal b of the memory cell structure 522 as shown in FIG. 4, and a source terminal voltage VS=−0.8V or a voltage value greater than this value as shown in FIG. 5 may be applied to the source line SL2 corresponding to the common terminal b. The drain terminal may be the drain terminal of the memory cell structure 522 as shown in FIG. 4, and a drain terminal voltage VD=1.7V as shown in FIG. 5 may be applied to the bit line BL2 corresponding to the drain terminal.

The value of the bias voltage VB is a negative value less than zero, and the values of the source terminal voltage VS and the drain terminal voltage VD are greater than or equal to the value of the bias voltage VB. The voltage value here is a value that distinguishes positive and negative values, and is not an absolute value of a positive or negative value. The negative value may also indicate that the corresponding negative voltage is a reverse voltage. For example, the bias voltage VB=−0.8V is a bias voltage with a reverse voltage of 0.8V. When the values of the source terminal voltage VS and the drain terminal voltage VD are greater than or equal to the value of the bias voltage VB, for example, when the source terminal voltage is VS=−0.6V, the drain terminal voltage is VD=1.7V, and the values of the source terminal voltage VS and the drain terminal voltage VD are both greater than the bias voltage VB=−0.8V, the voltage values on the corresponding source lines and bit lines are both relatively low. That is, the corresponding voltages of both source terminal and drain terminal of the unselected memory cell structures (for example, the memory cell structures 512, 532, 542 etc. shown in FIG. 5) are also relatively low. This not only ensures that the problem of a PN forward conduction does not exist in the selected memory cell structure 522, but also prevents the unselected or half-selected memory cell structure from a transistor breakdown caused by a too large voltage. Thereby, the impact on the unselected memory cell structures is minimized.

In order to explain the above voltage biasing method of the memory cell array structure more clearly, further description will be made in the present disclosure as follows.

Regarding the large voltage faced by the unselected transistor brought about by the deep well negative bias structure, which results in the problem of affecting the reliability, there is further provided a memory array structure according to the present disclosure, as shown in the above FIG. 4 and FIG. 5. In this memory array structure, the word lines WL and the bit lines BL are arranged in parallel, and at the same time the word lines WL and the bit lines BL are perpendicular to the source lines SL. Compared with the memory cell structure of the above deep well negative pressure bias structure, this memory array structure may effectively avoid the high voltage problem to which the half-selected memory cell structure CELL will be subject. It should be noted that FIG. 4 and FIG. 5 show the arrangements of the same memory cell array structure.

As shown in FIG. 5, the Forming operation or the reset operation is performed on the memory cell structure in the second row and the second column, i.e., the operation is performed on the memory cell structure 522 in FIG. 4. At this time, as the bias voltage of the source terminal is the negative voltage VSL, the gate voltage VG applied to the gate terminal corresponding to word line WL2 is larger than VSL by a threshold voltage. When a gate voltage is applied to the unselected row (such as the row corresponding to the word line WL1), it is necessary to turn off the resistive cell CELL of the memory cell structure 521 in the first row, and therefore the bias voltage may be selected to be equal to VSL. At this time, the voltage applied to the drain terminal corresponding to the bit line BL2 is the high voltage VD, and the selector of the resistive cell CELL of the selected memory cell structure 522 is turned on. Due to the existence of the resistive cell CELL, a considerable voltage will fall on the resistive cell CELL, while the voltage falling on the selector is much lower than VD. Therefore, the voltages of the source-drain terminal and the gate-drain terminal of the selector are relatively small, and this will not cause a breakdown of the selector.

Therefore, different from a conventional memory array structure, in the present disclosure, the bit lines BL and the word lines WL are arranged in parallel, and the voltage applied to the bit lines BL is only applied to the resistive cell CELL of the memory cell structure in the row selected by the word lines WL The upper (corresponding to the word line WL2 shown in FIG. 5). That is, the resistive cells CELL of the memory cell structures 512, 532 and 542 in FIG. 4 are half-selected cells. At this time, as the voltage of the source terminal may be biased separately, it is only necessary to apply a relatively negative voltage to the source terminal (i.e., the common terminal b shown in FIG. 4) of the column (i.e., the memory cell array 520) where the resistive cell CELL of the memory cell structure 522 to be operated is located, so as to ensure the voltage difference requirement of the resistive cell CELL. For the cells that do not need programming operations, i.e., the memory cell arrays 510, 530 and 540 where the memory cell structures 512, 532 and 542 are located in FIG. 4, it is sufficient to correspondingly apply a negative voltage that may turn off the selector where the unselected resistive cell CELL is located. In the embodiments of the present disclosure, a same voltage as that applied to the word line WL1 may be applied to the source line SL1 of the first column (the memory cell array 510 in FIG. 4). Therefore, the source-drain voltage and the gate-drain voltage of the transistor are relatively small, and the transistor will not be broken down by the high voltage, so that the reliability is guaranteed.

In the memory array structure of this type, when the forming operation occurs, a large voltage may be formed between the drain terminals of the half-selected cells (i.e., the memory cell structures 512, 532 and 542 in FIG. 4) and the negative voltage of the deep well bias. In the forming operation, the drain terminal voltage VD is connected to a high voltage, and the drain terminal voltage of the half-selected resistive cell CELL is equal to VD, because the transistor is turned off. The deep well bias structure will be configured to be a negative voltage on the half-selected resistive cell CELL, and this will cause its drain terminal and the PN junction of the first well layer to be subject to a large reverse bias voltage. However, relative to the large voltage, the transistor is more sensitive to the source-drain voltage, followed by the gate-source voltage and the gate-drain voltage, and the reverse bias voltage of the PN junction is generally large, which will not cause a breakdown of the transistor.

As shown in FIG. 4 and FIG. 5, in the embodiments of the present disclosure, a forming operation or a reset operation is performed on a black-filled memory cell structure (i.e., the memory cell structure 522 in FIG. 4). It is assumed that the required operation voltage is greater than 2.5V, and it is assumed here that the voltage falling on the resistive cell CELL is required to about 2.5V to complete the forming operation. If a traditional process (non-deep well negative voltage bias) is used, such a large voltage is not easy to be transmitted into the memory cell. Meanwhile, the WL and the BL are designed to be perpendicular to each other in the traditional array structure, and this will cause the transistors of the unselected memory cells to be broken down by a large voltage. As shown in FIG. 3, an upper portion and a lower portion of the selected memory cell structure 301 are the half-selected memory cells structures 303 and 302. As the transistors are not turned on at this time, the high voltage is completely biased on the transistors, and this is very likely to cause the transistors to be broken down. In the present disclosure, the memory cell structure with the deep well negative voltage bias and the memory array structure in which the word lines WL and the bit lines BL are parallel to each other are used, and this makes the voltages of all transistors in the array within a reliable operation range. As shown in FIG. 5, the selected cell corresponds to the memory cell structure 522 shown in FIG. 4. The above deep well bias structure is used in the memory cell structure 522, and the well bias is −0.8V. Therefore, the source line SL2 of the memory cell structure 522 may also be biased to −0.8V, and at this time the problem of the PN junction forward conduction between the substrate layer and the source terminal will not occur. A voltage of 0.3V is applied to the word line WL2 of the selected memory cell structure 522, so that the gate-source voltage is 1.1V, and the transistor may be fully turned on. In order to realize the forming operation, a voltage of 1.7V is applied to the bit line BL2 terminal of the memory cell structure 522. As a resistance value of the resistive cell CELL of the memory cell structure 522 is relatively large, the voltage basically falls on both terminals of the memory cell structure 522, about 2.5V (i.e., 1.7V+0.8V=2.5V), so as to complete the forming operation. At the same time, the voltage difference between any two terminals of the transistor is relatively low, and this reduces the reliability problem to the greatest extent. For the unselected memory cell structure, and the half-selected memory cell structure with a reliability risk, for example, those shown in FIG. 5 corresponding to the memory cell structures 512, 522, 532 and 542 in FIG. 4, in order not to perform an operation to them, a relatively high voltage may be applied to the source line ends SL1, SL3 and SL4 thereof, for example, it may be selected to be 0.3V. It can be seen that in the half-selected risky memory cell structure, the voltages of any two terminals thereof are low except for that the voltages of the substrate layer and the source terminal are high. As the substrate layer and the source terminal form a PN junction structure of a memory cell structure with a deep well bias structure, at this time, the reverse breakdown voltage that the PN junction structure may withstand is much greater than the operation voltage applied to it, and this will not cause a breakdown of the PN junction of the transistor.

With this regard, the present disclosure subverts the arrangement rules of the traditional memory array structure, and redesigns the arrangement structure of the memory cell array. The directions of WL, BL and SL are recombined, so that when the forming operation, the set operation and the reset operation are performed on the memory array structure, the voltage difference between any two terminals of the selector of the unselected resistive cell CELL that does not need to be operated will not exceed the breakdown voltage. Thereby, the memory array structure is more stable and reliable, and the volume and area size are well controlled. This is a subversive solution design in the field of memory, which makes the application and promotion of an embedded memory reach a new height and has an extremely high commercial value and scientific value.

According to the present disclosure, there is provided a memory cell structure, a memory array structure, and a voltage biasing method. The memory cell structure includes: a substrate layer, a well layer and a transistor. The substrate layer is configured to support the memory cell structure; the well layer is embedded in the substrate layer, an upper surface of the well layer is flush with an upper surface of the substrate layer, and a transistor is arranged on the well layer. In the present disclosure, a deep well bias is performed on the memory cell structure, so that the well voltage of the memory cell may be individually biased to a specific voltage, and in combination with the redesigned memory cell array structure, the applied programming voltage mostly falls on the memory cell structure. This reduces the programming voltage of the memory cell, and avoids a breakdown of the selecting transistor due to an excessively large voltage, thereby ensuring a great reliability of the device and a higher efficiency within the area of the memory cell array structure.

The specific embodiments above further describe the objects, technical solutions and beneficial effects of the present disclosure in detail. It should be understood that the above are only specific embodiments of the present disclosure, and are not intended to limit the present disclosure. Any modification, equivalent replacement, improvement, etc. made within the spirit and principle of the present disclosure should be included within the protection scope of the present disclosure.

What is claimed is:
1. A memory array structure, comprising:
 a plurality of memory cell array groups arranged in parallel to one another in a first direction, wherein each memory cell array group comprises a plurality of memory cell arrays arranged in parallel to one another in a second direction, and each memory cell array comprises a plurality of memory cell structures;
 a plurality of bit lines arranged in parallel to one another in a first direction, wherein at least two bit lines are respectively connected to two terminals of the plurality of memory cell arrays in a second direction; and
 a plurality of word lines arranged in parallel to one another in the first direction, wherein the plurality of word lines and the plurality of bit lines are in parallel to one another, and each word line is connected to a gate of a memory cell structure at a corresponding position among the plurality of memory cell arrays in the second direction, wherein an individual memory cell array at least comprises:
a first memory cell structure, wherein a drain terminal of the first memory cell structure is connected to a bit line; and
a second memory cell structure, wherein a drain terminal of the second memory cell structure is connected to another bit line, and a source of the second memory cell structure is connected to a source of the first memory cell structure to form a common terminal;
wherein the drain terminal further comprises a resistive cell connected to a drain of the first memory cell structure or a drain of the second memory cell structure,
wherein the memory array structure further comprises:
a plurality of source lines arranged in parallel to one another in the second direction, wherein each source line is connected to a common terminal in a corresponding memory cell array in the first direction;
wherein the source line is perpendicular to both the bit line and the word line.

2. The memory array structure of claim 1, wherein the memory cell structure comprises:
a substrate layer configured to provide a support for the memory cell structure;
a well layer embedded in the substrate layer, wherein an upper surface of the well layer is flush with an upper surface of the substrate layer; and
a transistor arranged in an inside and on a surface of the well layer.

3. The memory array structure of claim 1, wherein the well layer comprises:
a first well layer embedded in the substrate layer, wherein an upper surface of the first well layer is flush with the upper surface of the substrate layer; and
a second well layer arranged between the first well layer and the substrate layer, wherein an upper surface of the second well layer is flush with the upper surface of the substrate layer, and configured to space the first well layer and the substrate layer;
wherein the transistor is arranged in an inside and on a surface of the first well layer.

4. The memory array structure of claim 3, wherein
the substrate layer is a non-P-type or an N-type doped structure layer;
the first well layer is a P-type doped structure layer for forming a P-type well layer; and
the second well layer is an N-type doped structure layer for forming an N-type well layer as an isolation between the substrate layer and the P-type well layer.

5. The memory array structure of claim 3, wherein the transistor comprises:
a gate arranged on the upper surface of the first well layer;
a source embedded in the first well layer, wherein an upper surface of the source is exposed to the first well layer; and
a drain embedded in the first well layer, wherein an upper surface of the drain is exposed to the first well layer.

6. The memory array structure of claim 5, wherein
the drain and the source are spaced for a certain distance; and
the gate is arranged on the upper surface of the first well layer between the drain and the source.

7. The memory array structur of claim 6, wherein the memory cell structure further comprises:
a first resistive cell located above the drain or the source;
a first interconnection layer comprising a plurality of interconnection sublayers, wherein the first resistive cell is in contact with the upper surface of the drain or the source, and the plurality of interconnection sublayers are located above the first resistive cell; and
a first connection line arranged in an arrangement direction of the first interconnection layer and the first resistive cell, and configured to connect the first interconnection layer and the first resistive cell with the source or the drain.

8. The memory array structure of claim 6, wherein the memory cell structure further comprises:
a second resistive cell located above the drain or the source;
a second interconnection layer comprising a plurality of interconnection sublayers, wherein at least one interconnection sublayer of the plurality of interconnection sublayers is located between the second resistive cell and the drain or the source, and the other interconnection sublayers are located above the second resistive cell; and
a second connection line arranged in an arrangement direction of the second interconnection layer and the second resistive cell, and configured to connect the second resistive cell and the second interconnection layer with the source or the drain.

9. The memory array structure of claim 3, further comprising:
a first well electrode embedded in the first well layer, wherein an upper surface of the first well electrode is exposed to the first well layer; and
a second well electrode embedded in the second well layer, wherein an upper surface of the second well electrode is exposed to the second well layer.

10. The memory array structure of claim 1, wherein the first direction is perpendicular to the second direction.

11. A voltage biasing method, applied to the memory array structure of claim 1, wherein the voltage biasing method comprises:
applying a bias voltage to a determined first well layer of a memory cell structure in the memory array structure;
applying a source terminal voltage to a source line corresponding to a common terminal of the memory cell structure, and simultaneously applying a drain terminal voltage to a bit line corresponding to a drain terminal of the memory cell structure;
wherein a value of the bias voltage is a negative value smaller than zero, and values of the source terminal voltage and the drain terminal voltage are values greater than or equal to the value of the bias voltage.

* * * * *